S. P. Mecay.
Revolving Rake.
Nº 76932          Patented Apr. 21, 1868.
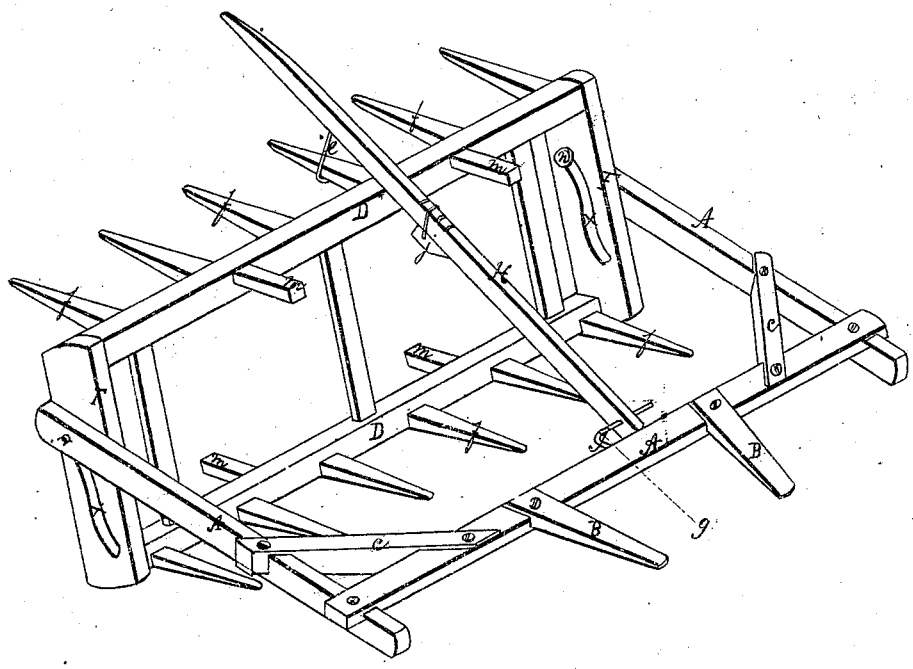
Witnesses
Wm Wunsleben
O.D. Stockbridge
Inventor
S.P. Mecay

United States Patent Office.

SAMUEL P. MECAY, OF KILLBOURNE, OHIO.

Letters Patent No. 76,932, dated April 21, 1868.

IMPROVEMENT IN HORSE-RAKES.

The Schedule referred to in these Letters Patent and making part of the same.

TO ALL WHOM IT MAY CONCERN:

Be it known that I, SAMUEL P. MECAY, of Killbourne, in the county of Delaware, and in the State of Ohio, have invented certain new and useful Improvements in Horse Hay-Rakes; and do hereby declare that the following is a full, clear, and exact description thereof, reference being had to the accompanying drawing and the letters of reference marked thereon.

In the annexed drawings, making a part of this specification, A represents a suitable frame, strengthened by the corner braces $c$ $c$, and having shafts, B, secured to the front thereof, for the horse or other animal to work between, and guide the rake, and thereby prevents the rake from working at an angle with the work.

A double rake-head, D D, framed and held together by cross-heads F F, is adjusted in the frame A, as will be hereafter more fully described. The cross-heads F F are each provided with an S-shaped slot, $x$, in which work the pins $r$, which hold the double rake-head to the frame.

Rake-teeth $f$ $f$ are secured, as shown, in the heads D D. In the heads D D, I secure spurs $m$ $m$, which project backward, so that the head may be rocked slightly to overcome inequalities in the ground.

H represents an adjustable lever or handle, which I pivot to the front of the frame A, as shown in the drawings. Said handle, H, is made of suitable length, to extend back behind the rake-head D.

Attached to the handle H is an adjustable shoulder, $j$, for the purpose of holding the rake-head steady, and from turning, as may be desired. The shoulder $j$ is made of a small block, adjusted to the under side of the handle H, and held in any place desired by means of a loop, embracing said handle, which catches in one of a series of notches on the back or upper side thereof.

Attached to the handle H, just behind the rake-head D, is a small hook, $l$, which may be caught beneath one of the teeth $f$, or detached therefrom, at pleasure. The hook $l$ is designed to afford a convenient device for the operator to turn the rake at any time or place desired, and the shoulder $j$ is for the purpose of holding the rake-head from turning or revolving, as long as may be desired.

The double rake-head revolves on the pins or projections $r$ $r$, which work in the S-shaped slots $x$ $x$, the draught coming at the bottom of the slot $x$ changing from one end to the other end thereof.

Having thus fully described my invention, what I claim as new, and desire to secure by Letters Patent, is—

1. The handle H, when pivoted to the frame, and provided with an adjustable shoulder, $j$, and hook $l$, for the purpose of regulating the double rake-head D, as and for the purpose specified.

2. The double rake-head D, provided with S-shaped slots $x$ $x$, in the cross-heads thereof, and having spurs $m$ $m$ secured therein, in combination with handle H and frame A, as and for the purpose specified.

In testimony that I claim the foregoing, I have hereunto set my hand, this 1st day of February, 1868.

SAMUEL P. MECAY.

Witnesses:
WILLIAM FARRIS,
D. R. ROSS.